United States Patent
Shi et al.

(10) Patent No.: US 11,878,328 B2
(45) Date of Patent: Jan. 23, 2024

(54) COLOR SORTING METHOD FOR SMALL-GRAIN AGRICULTURAL PRODUCTS COMBINING AREA SCANNING PHOTOELECTRIC CHARACTERISTIC AND LINE SCANNING PHOTOELECTRIC CHARACTERISTIC

(71) Applicant: Jiangsu University, Jiangsu (CN)

(72) Inventors: Jiyong Shi, Jiangsu (CN); Yu Shi, Jiangsu (CN); Xiaobo Zou, Jiangsu (CN); Xiaowei Huang, Jiangsu (CN); Zhihua Li, Jiangsu (CN); Zhiming Guo, Jiangsu (CN); Changsheng Qiao, Jiangsu (CN); Junwei Yu, Jiangsu (CN); Xinai Zhang, Jiangsu (CN); Di Zhang, Jiangsu (CN); Xiaodong Zhai, Jiangsu (CN); Xuetao Hu, Jiangsu (CN); Tingting Shen, Jiangsu (CN); Chenguang Zhou, Jiangsu (CN); Yang Zhang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 143 days.

(21) Appl. No.: 17/626,502

(22) PCT Filed: Nov. 2, 2021

(86) PCT No.: PCT/CN2021/128062
§ 371 (c)(1),
(2) Date: Jan. 12, 2022

(87) PCT Pub. No.: WO2023/065396
PCT Pub. Date: Apr. 27, 2023

(65) Prior Publication Data
US 2023/0256473 A1    Aug. 17, 2023

(30) Foreign Application Priority Data
Oct. 22, 2021    (CN) .......................... 202111235116.X

(51) Int. Cl.
*B07C 5/342* (2006.01)
*G06F 18/2134* (2023.01)

(52) U.S. Cl.
CPC .......... *B07C 5/3422* (2013.01); *B07C 5/3425* (2013.01); *G06F 18/2134* (2023.01)

(58) Field of Classification Search
CPC ..... B07C 5/3422; B07C 5/3425; B07C 5/342; B07C 5/363; B07C 5/365; B07C 5/366; B07C 5/367; B07C 5/368; G06F 18/2134
(Continued)

(56) References Cited

U.S. PATENT DOCUMENTS

| | | | | |
|---|---|---|---|---|
| 5,305,894 A | * | 4/1994 | McGarvey | ............ B07C 5/3422 209/639 |
| 5,848,706 A | * | 12/1998 | Harris | ..................... B07C 5/366 209/580 |

(Continued)

FOREIGN PATENT DOCUMENTS

| | | |
|---|---|---|
| CN | 203610329 | 5/2014 |
| CN | 204159564 | 2/2015 |

(Continued)

*Primary Examiner* — Gene O Crawford
*Assistant Examiner* — Muhammad Awais
(74) *Attorney, Agent, or Firm* — JCIPRNET

(57) ABSTRACT

A color sorting method for small-grain agricultural products combining an area scanning photoelectric characteristic and a line scanning photoelectric characteristic is provided. The present invention obtains an area scan image of small-grain agricultural product materials on a conveyor belt by using an area scan camera, which can accurately extract area array features of the materials and realize accurate identification of the unqualified materials. At the same time, the present invention can provide key parameters for accurate positioning during free falling of the materials while identifying the unqualified materials by using the area scan image, and can (Continued)

cooperate with the line scan positioning camera and the pneumatic nozzle to achieve high-speed elimination of the unqualified materials.

7 Claims, 3 Drawing Sheets

(58) Field of Classification Search
USPC .................................................. 209/580, 606
See application file for complete search history.

(56) References Cited

U.S. PATENT DOCUMENTS

| | | | |
|---|---|---|---|
| 8,827,082 B2 * | 9/2014 | Radema | B65G 47/08 |
| | | | 209/552 |
| 8,985,342 B2 * | 3/2015 | Tanaka | B07C 5/3425 |
| | | | 209/580 |
| 2005/0099620 A1 * | 5/2005 | De La Ballina | G01B 11/2433 |
| | | | 356/237.1 |
| 2016/0354809 A1 * | 12/2016 | Gruna | B07C 5/10 |

FOREIGN PATENT DOCUMENTS

| | | | | |
|---|---|---|---|---|
| CN | 204974516 | | 1/2016 | |
| CN | 110090818 A | * | 8/2019 | ............. B07C 5/342 |
| CN | 113458016 A | * | 10/2021 | ............. B07C 5/342 |
| WO | WO-2021037417 A1 | * | 3/2021 | ............. B07C 5/342 |

\* cited by examiner

COLOR SORTING METHOD FOR SMALL-GRAIN AGRICULTURAL PRODUCTS COMBINING AREA SCANNING PHOTOELECTRIC CHARACTERISTIC AND LINE SCANNING PHOTOELECTRIC CHARACTERISTIC

CROSS-REFERENCE TO RELATED APPLICATION

This application is a 371 of international application of PCT application serial no. PCT/CN2021/128062, filed on Nov. 2, 2021, which claims the priority benefit of China application no. 202111235116.X, filed on Oct. 22, 2021. The entirety of each of the above mentioned patent applications is hereby incorporated by reference herein and made a part of this specification.

TECHNICAL FIELD

The present invention belongs to the technical field of quality detection of agricultural products, and in particular, to a color sorting method for small-grain agricultural products combining an area scanning photoelectric characteristic and a line scanning photoelectric characteristic.

BACKGROUND

According to the difference in the optical characteristics of agricultural product materials, a photoelectric color sorting method uses photoelectric sensors combined with a pneumatic sorting mechanism to sort out different-colored and special-shaped materials in granular materials, which can realize the quality detection of small-grain agricultural products. In order to achieve high-efficiency sorting of large quantities of small-grain agricultural products, the existing photoelectric color sorting method first forces the materials into a single-layer waterfall-like free-fall state, and then uses a high-speed line scan camera to obtain photoelectric signals corresponding to the materials in the free-fall state in real time. Subsequently, a line scan signal corresponding to the material is sent to a computer for rapid analysis and an analysis result is fed back to the pneumatic sorting mechanism. Finally, the pneumatic sorting mechanism ejects an airflow on unqualified materials before the materials end the free-fall state, so that the unqualified materials and qualified materials have different falling trajectories, so as to realize mass color sorting of the unqualified materials, such as patents CN201320636345.7 and CN201420509399.1.

The free falling of the agricultural product materials is a process of continuous acceleration of gravity. The falling speed of the materials is not only high but also different at different heights, which makes it difficult for the area scan camera to accurately capture images, and the area array signal analysis is time-consuming, which makes it difficult for the pneumatic sorting mechanism to realize the sorting of the unqualified materials before the materials end the free-fall state. The line scan camera can accurately obtain the line scan signal of high-speed moving materials, and the resolution time of a single line scan signal is much lower than that of a single area scan signal. Therefore, the line scan signal is widely used for mass color sorting of the agricultural product materials. However, due to factors such as camera performance, material handling capacity, and height of a color sorter, even the high-speed line scan camera cannot realize the analysis of all surface areas of granular materials one by one in the high-speed fall state. Omission of the scan area and a processing method of the single line scan signal lead to the accuracy of its image analysis lower than that of a traditional area array imaging method. The final manifestation of this shortcoming is poor sorting accuracy corresponding to the color sorting method, such as the patent CN201520700362.1.

In view of this, in order to overcome the shortcomings of the existing technical solutions, the present invention uses the characteristics of high resolution of an area scan image and fast resolution of a line scan image signal, and provides a color sorting method for small-grain agricultural products combining an area scanning photoelectric characteristic and a line scanning photoelectric characteristic.

SUMMARY OF INVENTION

A color sorting method for small-grain agricultural products combining an area scanning photoelectric characteristic and a line scanning photoelectric characteristic includes three steps of area scanning identification on small-grain agricultural products, line scanning positioning on unqualified agricultural products during falling, and pneumatic sorting on the unqualified agricultural products:

step I, performing the area scanning identification on the small-grain agricultural products, including the following processes:

process I, erecting an area scan camera above an outlet of a conveyor belt of a material conveying device, setting a width of an area scan area of the area scan camera to be equal to a width W of the conveyor belt, and meanwhile setting a length of the area scan area of the camera as L and a conveying speed of the conveyor belt as V0; and starting the camera cyclically to obtain an area scan image I_t of the area scan area containing M×N pixels at each of different moments of t;

process II, analyzing the small-grain agricultural products in the area scan image I_t by using an image processing algorithm, extracting area array features of single-grain agricultural products in the area scan image one by one, identifying unqualified agricultural products in the area scan image I_t according to the area array features, and marking areas A_t_1, A_t_2, ..., A_t_(n−1), and A_t_n corresponding to the unqualified agricultural products, where n is a number of particles of the unqualified agricultural products in the area scan image I_t, and a value of n is a natural number; and process III, establishing a rectangular coordinate system by taking a y-axis of a conveying direction of the conveyor belt as a positive direction, a lower left vertex of the scan area of the area scan camera as a coordinate origin (0, 0), and a pixel point as a minimum unit of a coordinate scale; and locating center pixels P_t_i (x, y) of areas A_t_i corresponding to the unqualified agricultural products one by one, calculating time $\Delta t1\_i$ required for the unqualified agricultural products of the A_t_i to move from a position at a moment of t to a line scan area, and arrangement orders p_i of the unqualified agricultural products of the A_t_i in an x-axis direction in the current area scan image I_t so as to determine positioning parameters K_t_i (t, i, $\Delta t1\_i$, p_i) corresponding to the unqualified agricultural products of the A_t_i, and feeding back the positioning parameters to a central control module, where i∈[1, n];

step II, performing the line scanning positioning on the unqualified agricultural products during the falling of the agricultural products, including the following processes:

process i, starting a line scan positioning camera by the central control module at the moments of t+$\Delta t1\_i$ successively in the order of $\Delta t1\_i$ from small to large according to the positioning parameters K_t_i (t, i, $\Delta t1\_i$, p_i) corresponding to the area scan image I_t fed back in step I to obtain line scan signals L_t_i corresponding to the unqualified agricultural products of the A_t_i, where a number of pixels is H;

process ii, returning a signal value less than or equal to h in the L_t_i to 0 by taking the h as a denoising threshold, then calculating a peak width F_t_i corresponding to a (p_i)-th peak in the L_t_i, and calculating a pixel position D_t_i corresponding to a half-peak width (F_t_i)/2; and process iii, determining pneumatic sorting nozzles q_i corresponding to the unqualified agricultural products of the A_t_i in combination with the D_t_i according to a calibrated corresponding relationship between a line scan signal pixel and a position of the pneumatic sorting nozzle; and meanwhile, calculating time $\Delta t2\_i$ required for movement from a position of the unqualified agricultural products of the A_t_i to an action site of the pneumatic nozzle at the moment of t+$\Delta t1\_i$ so as to determine sorting parameters Q_t_i (t, i, $\Delta t1\_i$, $\Delta t2\_i$, q_i) of the unqualified agricultural products of the A_t_i, and feeding the sorting parameters back to the central control module; and step III, performing the pneumatic sorting on the unqualified agricultural products, including the following processes:

controlling an airflow ejected from the (q_i)-th pneumatic sorting nozzle by the central control module at the moments of $\Delta t1\_i+\Delta t2\_i$ successively in the order of $\Delta t1\_i+\Delta t2\_i$ from small to large according to the sorting parameters Q_t_i (t, i, $\Delta t1\_i$, $\Delta t2\_i$, q_i) corresponding to the area scan image I_t fed back in step II to change a falling trajectory of the unqualified agricultural products of the A_t_i to make it fall to an unqualified product slot and realize pneumatic sorting on the unqualified agricultural products.

Further, in step I, a method for calculating the arrangement orders p_i of the unqualified agricultural products of the A_t_i in the x-axis direction in the area scan image I_t includes first, according to the established rectangular coordinate system, determining the center pixel coordinates P_t_i (x, y) of the unqualified agricultural products A_t_i; then, binarizing the area scan image I_t to obtain m line segments on a connecting line of a pixel point (0, P_t_i (y)) and a pixel point (M, P_t_i (y)), and extracting coordinates (Z_k', P_t_i (y)) and (Z_k", P_t_i (y)) of two end points of the m line segments respectively; and finally, determining a relationship between the center pixel coordinates P_t_i (x, y) of the unqualified agricultural products A_t_i and the coordinates (Z_k', P_t_i (y)) and (Z_k", P_t_i (y)) of the end points, where when Z_k'<P_t_i (x)<Z_k", it is determined that the arrangement orders of the unqualified agricultural products of the A_t_i along the x-axis in the area scan image I_t are as follows: p_i=k, and m is an integer greater than 0, and k∈[1, m].

Further, in step I, a method for determining the time $\Delta t1\_i$ required for the unqualified agricultural products of the A_t_i to move from the position at the moment of t to the scan area of the line scan positioning camera includes $\Delta t1\_i=\Delta t1\_i\_1+\Delta t1\_i\_2$. $\Delta t1\_i\_1$ is required for uniform linear motion of the unqualified agricultural products of the A_t_i from the moment of t to an end of the conveyor belt. $\Delta t1\_i\_2$ is time for horizontal projectile motion of the unqualified agricultural products of the A_t_i from the end of the conveyor belt to the line scan area.

Further, a method for determining the $\Delta t1\_i\_1$ includes: $\Delta t1\_i\_1=\Delta L\_i/V0$, and V0 is a constant movement speed of the conveyor belt. $\Delta L\_i$ is a horizontal distance between the center pixels P_t_i (x, y) of the areas A_t_i of the unqualified agricultural products and an end of the conveyor belt. A calculation method for $\Delta L\_i$ is $\Delta L\_i=L*[N-P\_t\_i(y)]/N$.

Further, a method for determining the $\Delta t1\_i\_2$ is $$\Delta t1\_i\_2 = \left|\sqrt{\frac{2h1}{g}}\right|,$$

h1 is a height difference between a horizontal end of the conveyor belt and the line scan area, and a boundary line at the end of the conveyor belt is parallel to the line scan area. g is a gravity acceleration of a located area of color sorting equipment.

Further, in step II, a method for calibrating the corresponding relationship between the line scan signal pixel and the position of the pneumatic sorting nozzle is as follows. The line scan area of the line scan positioning camera has a width of W equal to a horizontal scan area of the area scan camera, and a single line scanning includes H pixels. A length of a total effective range of a pneumatic nozzle array is equal to that of the line scan area, a center line of an effective area of the pneumatic nozzle array is parallel to the line scan area, and a height difference between the center line and the line scan area is h2. It is assumed that an effective pneumatic interval length of each sorting nozzle q_j is E pixels, a number of nozzles R1 required for the pneumatic nozzle array to effectively act on the line scan area with a number of pixels of H is as follows:

first, when a remainder of H divided by E mod (H/E)=0, the number of required nozzles R1=(H/E), an effective working interval of the j-th nozzle is [(j−1)*E+1, j*E], and j∈[1, R1]; and second, when the remainder of H divided by E mod (H/E)≠0, the number of required nozzles R1=floor (H/E)+1; when j<R1, the effective working interval of the j-th nozzle is [(j−1)*E+1, j*E]; and when j=R1, the effective working interval is [floor (H/E)*E+1, H], floor (H/E) represents an integer part of H divided by E, and j∈[1, R1].

Further, in process Mifflin of step II, a method for determining the pneumatic sorting nozzle q_i corresponding to the unqualified agricultural products of the A_t_i includes q_i=floor [(D_t_i−1/E]+1, and floor [(D_t_i−1)/E] represents an integer part of (D_t_i−1) divided by E.

Further, in process iii of step II, a method for calculating the time $\Delta t2\_i$ required for the unqualified agricultural products A_t_i to move from the current position to the action site of the pneumatic nozzle at the moment of t+$\Delta t1\_i$ includes $$\Delta t2\_i = \frac{\sqrt{2(h1+h2)} - \sqrt{2h1}}{\sqrt{g}},$$

h2 is a height difference between the line scan area and a center line of an effective area of the nozzle, and an end of the conveyor belt is parallel to a scan line of the line scan area. g is a gravity acceleration of a located area of color sorting equipment.

Further, the central control module includes an industrial computer, a timer, and a programmable logic controller (PLC), and the area scan camera, the line scan positioning camera, and the line array pneumatic nozzle are all electrically connected to the central control module.

The scan area of the line scan positioning camera is a line parallel to a boundary line at the end of the conveyor belt, and a single line scanning includes H pixels.

The present invention has the following beneficial effects.

The present invention obtains the area scan image of granular agricultural product materials on a conveyor belt by using an area scan camera, which can accurately extract the area array features (contour, size, shape, etc.) of the materials, realize the accurate identification of the unqualified materials, and overcome the shortcoming of poor accuracy of the line array camera in identifying the unqualified materials of an existing color sorting method. At the same time, the present invention can provide key parameters for accurate positioning during free falling of the materials while identifying the unqualified materials by using the area scan image, and can cooperate with the line scan positioning camera and pneumatic nozzle to achieve high-speed elimination of the unqualified materials. The solution of the present invention solves the problem that an existing color sorting method has high sorting speed but poor accuracy for small-grain agricultural products, and can improve the color sorting accuracy for the unqualified materials while ensuring the color sorting speed.

DESCRIPTION OF EMBODIMENTS

The present invention will be further described in detail below in conjunction with some specific embodiments, but the protection scope of the present invention is not limited to these embodiments. In the present invention, a particle size or length range of small particles is 0.5-30 mm. Those of ordinary skill in the art may understand specific meanings of the above terms in the present invention based on a specific situation.

Embodiment 1

A color sorting method for wolfberry combining an area scanning photoelectric characteristic and a line scanning photoelectric characteristic has the advantages of use of high resolution of an area scan image and fast resolution of a line scan image signal, identifies and classifies wolfberry quality with an area scan camera, and locates and eliminates agricultural products with a line scan positioning camera, so as to further improve the performance of color sorting equipment.

Step I: Identification and classification on wolfberry quality with an area scan camera include the following processes.

Figure 1:
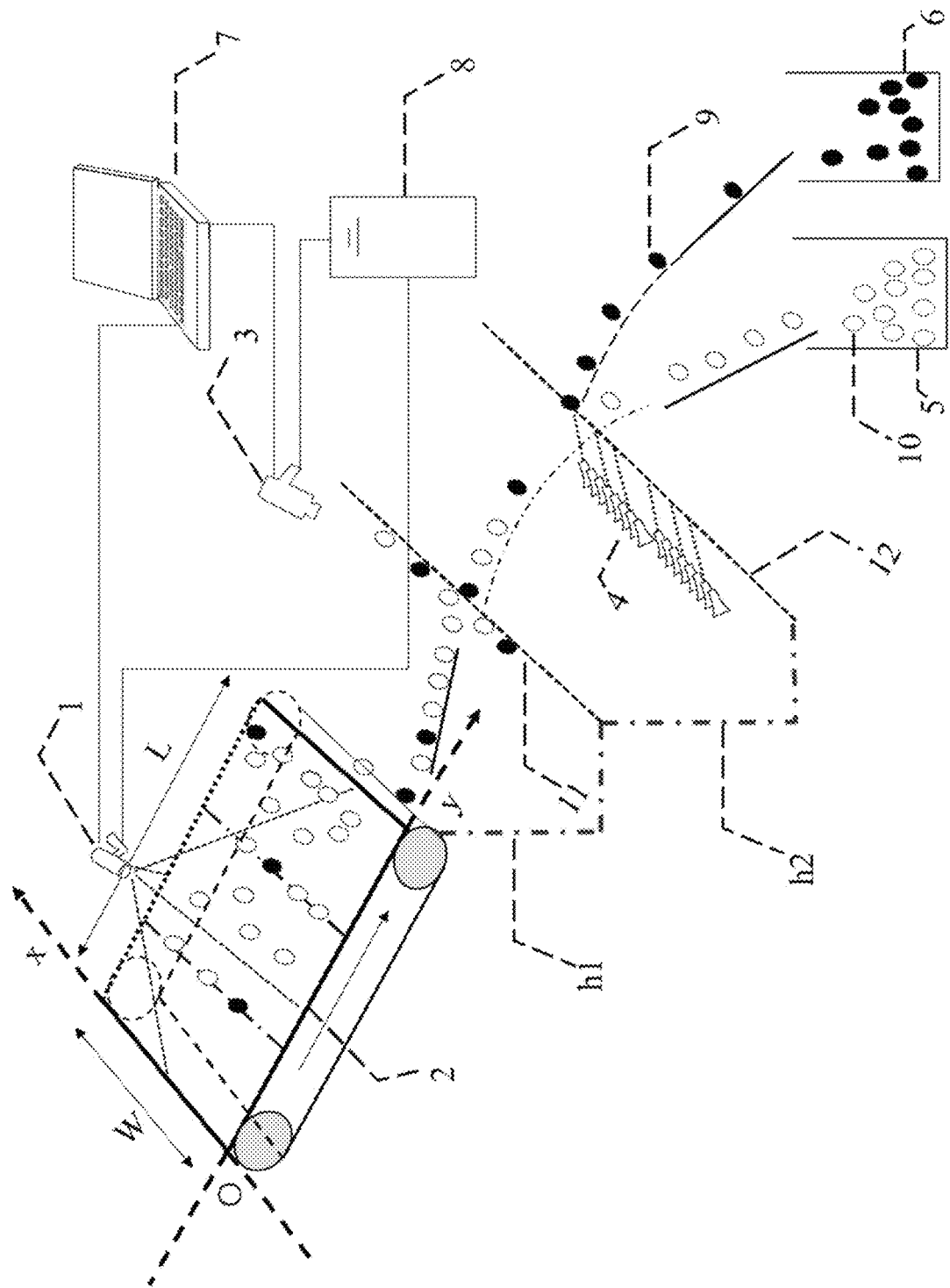
FIG. 1 is a diagram of an embodiment of the present invention.

Process I: As shown in FIG. 1, an area scan camera 1 is erected above an outlet of a conveyor belt of a material conveying device 2. The area scan camera 1 is an MV-VS series 1394 high-speed CCD industrial camera with a camera resolution of 1280×960. A width of an area scan area of the camera is set to be equal to a width of the conveyor belt W=0.5 m. Meanwhile, a length L of the area scan area of the camera is set as L=0.3 m, and a conveying speed V0 of the conveyor belt is set as 2 m/s. At the moment of t=1 s when materials start to be conveyed, the camera is started to obtain an area scan image I_i of 1280 (M)×960 (N) pixels corresponding to the area scan area.

Process II: An industrial computer 7 has a built-in image processing algorithm.

Figure 3:
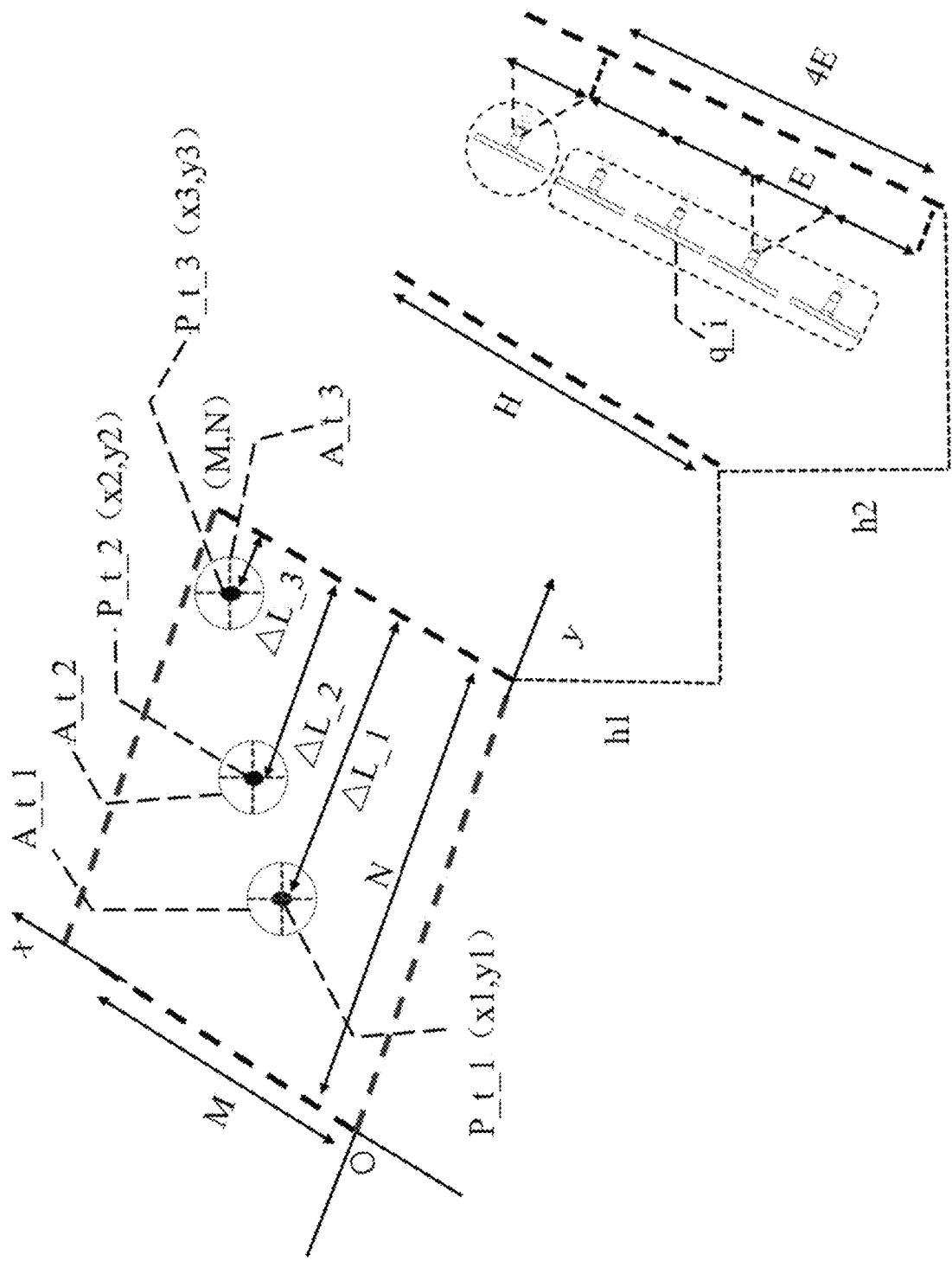
FIG. 3 is an annotation diagram of basic parameters according to Embodiment 1 of the present invention, where M is a horizontal scan pixel of an area scan area of an area scan camera, N is a vertical scan pixel of the area scan area of the area scan camera, H is a single line scan pixel of a line scan positioning camera, E is an effective length of a single nozzle in pixels, and 4E represents an effective length of four nozzles in pixels.

Wolfberry in the area scan image I_1 is analyzed by using the image processing algorithm. Area array features of single-grain wolfberry in the image are extracted one by one. As shown in FIG. 3, three unqualified wolfberries in the I_1 are identified according to the area array features, and three areas A_1_1, A_1_2, and A_1_3 corresponding to the unqualified wolfberries are marked.

Process III: Center pixels P_1_$i$ (x, y) of areas A_1_$i$ corresponding to the unqualified wolfberries are located one by one. Center pixels of the unqualified agricultural products A_1_$i$ obtained by positioning of the area scan camera are respectively P_1_1 (512, 320), P_1_2 (768, 640), and P_1_3 (1230, 800).

Positioning parameters K_1_$i$ (1, i, Δt1_$i$, p_i) corresponding to the wolfberries of the A_1_$i$ are calculated, and fed back to a central control module (the central control module includes the industrial computer 7, a timer, and a PLC, and the area scan camera 1, a line scan positioning camera 3 and a line array pneumatic nozzle are all electrically connected to the central control module). Δt1_$i$ is time required for the wolfberries of the A_1_$i$ to move from a position at the moment of t=1 s to a scan area of the line scan positioning camera 3. As shown in FIG. 3, it can be seen from image processing results that a distance between the unqualified wolfberries of A_1_1 and an end of the conveyor belt is ΔL_1=L*[N−P_1_1($y$)]/N=0.3×(960−320)/960=0.2 m, so time required for the unqualified wolfberries of A_1_1 to move to the end of the conveyor belt is Δt1_1_1=ΔL_1/V0=0.2/2=0.1 s. A boundary line at the end of the conveyor belt is designed to be parallel to the line scan area 11, and a height difference between the boundary line and the line scan area is h1=0.8 m, so time for horizontal projectile motion of the wolfberry to the line scan area can be obtained as $$\Delta t1\_1\_2 = \left| \sqrt{\frac{2h1}{g}} \right| = \left| \sqrt{\frac{2 \times 0.8}{9.8}} \right| = 0.404 s$$

(the line scan area 11 is a line parallel to the boundary line at the end of the conveyor belt; and the h1 is essentially a distance between the two parallel lines, so the height difference between the boundary line at the end of the conveyor belt from which the wolfberry does horizontal projectile motion and the line scan area 11 is determined).

Figure 2:
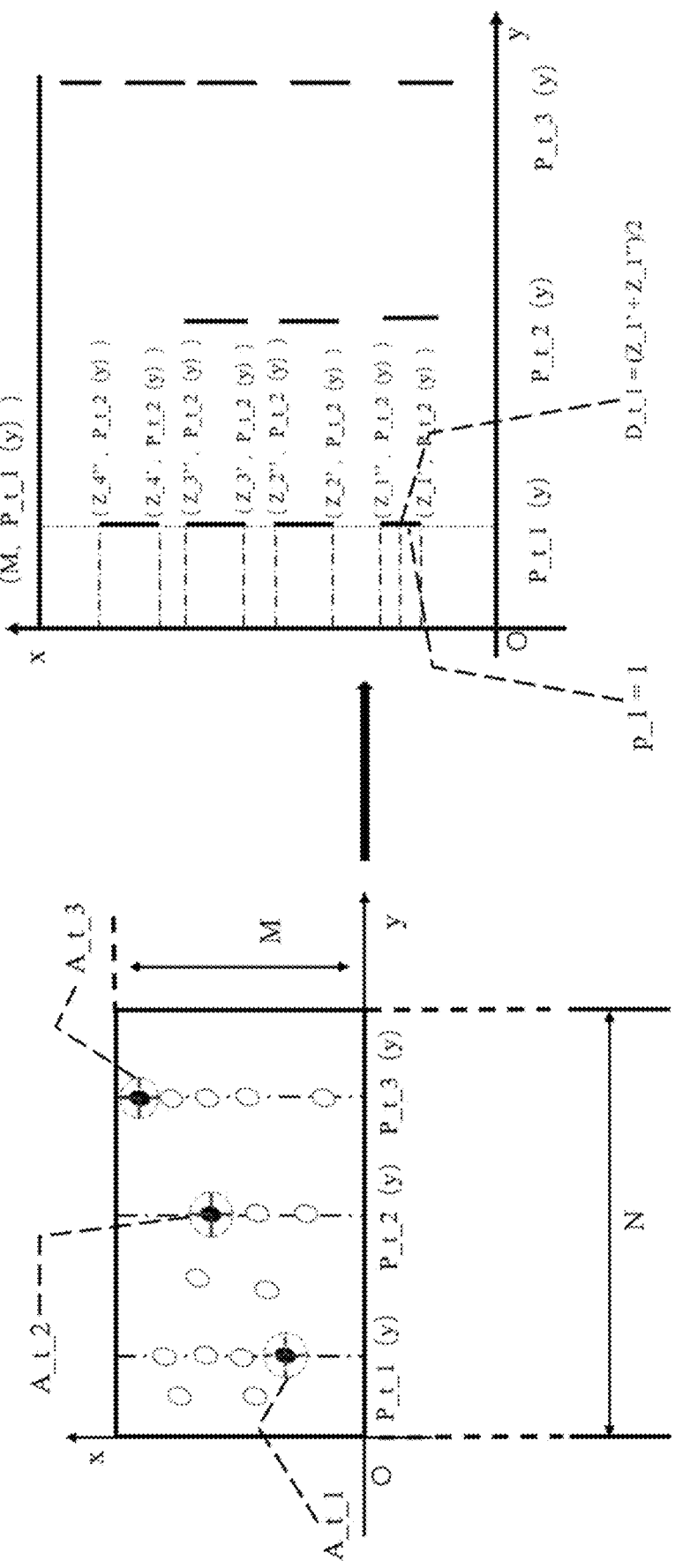
FIG. 2 is a schematic diagram of calibration of arrangement orders of articles according to Embodiment 1 of the present invention.

Therefore, according to a calculation method Δt1_$i$=Δt1_$i$_1+Δt1_$i$_2, the time required for the wolfberries of the A_1_1 to move from the position at the moment of t=1 s to the line scan area 11 can be obtained as $\Delta t1\_1=\Delta t1\_1\_1+\Delta t1\_1\_2=0.1$ s+0.0404 s=0.504 s.

p_i is arrangement orders of the unqualified agricultural products of the A_1_i in an x-axis direction in the area scan image I_1. An ordinate of the center pixel of the unqualified wolfberry A_1_1 is P_t_i (y)=P_1_1 (y)=320. The area scan image I_1 is binarized. As shown in FIG. 2, a point (0, 320) and a point (1280, 320) are connected. Coordinates of end points of m line segments on a connecting line are taken (the end points of the line segments are two end points of the wolfberry after binarization on the connecting line). As shown in FIG. 2, there are a total of m=4 wolfberries on the connecting line of the point (0, 320) and the point (1280, 320). The two end points of each wolfberry are connected, and there are 4 different line segments on the corresponding lines. An abscissa between the lines is positive from small to large, and the abscissas Z_k' and Z_k" (k∈[1,4]) of the two end points of the k-th line segment (that is, the k-th wolfberry in m wolfberries) in the x-axis direction on the connecting line are determined. The calculation results are Z_1'=491, Z_1"=533, Z_2'=617, Z_2"=663, Z_3'=717, Z_3"=763, Z_4'=937, and Z_4"=983. An abscissa of the center pixel of the unqualified wolfberry A_1_1 is P_1_1 (x)=512, Z_1'=491<P_1_1 (x)=512<Z_1"=533, that is, P_1_1 (x)∈[Z_1',Z_1"], so it can be seen that p_1=1.

Divided by interval, if it falls in a first interval, p_1=1. For example, [Z_k', Z_k"] represents a k-th interval, if the abscissas of the center pixels of the unqualified wolfberries A_t_i are in the interval [Z_k', Z_k"], the order is p_i=k.

In the same way, on a connecting line of a point (0, 640) and a point (1280, 640), P_1_2 (x)=768, Z_3'=747<P_1_2 (x)=768<Z_3"=789, that is, P_1_2 (x)∈[Z_3', Z_3"], so it can be seen that p_2=3. On a connecting line of a point (0, 800) and a point (1280, 800), P_1_3 (x)=1230, Z_5'=1209<P_1_3 (x)=1230<Z_5"=1251, that is, P_1_3 (x)∈[Z_5', Z_5"], so it can be seen that p_3=5.

In summary, it can be seen that the positioning parameter of the unqualified wolfberry of the A_1_1 is K_1_1 (1, 1, 0.504, 1), and the physical meaning of the positioning parameter is expressed as follows: at the moment of the conveyor belt movement for 1 s, the area scan camera 1 acquires the area scan image I_1 in the scan area, and the computer performs image processing on the acquired area scan image I_1. The result after processing is that the unqualified wolfberries of the A_1_1 are in the first position in the x-axis direction relative to other wolfberries on the connecting line of the point (0, 320) and the point (1280, 320), and will fall to the line scan area 11 after 0.504 s.

In the same way, the positioning parameters of other unqualified wolfberries can be obtained as K_1_2 (1, 2, 0.454, 3), and K_1_3 (1, 3, 0.429, 5) respectively.

Step II: Line scanning positioning on the unqualified wolfberries A_1_1, A_1_2, and A_1_3 during falling includes the following processes.

Process I: The line scan positioning camera is turned on after three different moments of 0.504 s, 0.454 s, and 0.429 s to obtain line scan signals L_1_i (i∈[1, 3]) of three unqualified agricultural products, and single line scanning of the selected line scan positioning camera 3 includes H=1280 pixels. The line scan signals obtained successively in an order of 0.429 s<0.454 s<0.504 s from small to large are L_1_3, L_1_2, and L_1_1.

Process II: A signal value less than or equal to h in the L_t_i is returned to 0 by taking h as a denoising threshold, then a peak width F_t_i corresponding to a (p_i)-th peak in the L_t_i is calculated, and a pixel position D_t_i corresponding to a half-peak width (F_t_i)/2 is calculated.

The wolfberry corresponding to the A_1_3 is taken as an example, and a sorting parameter Q_1_i (1, i, $\Delta t1\_i$, $\Delta t2\_i$, q_i) is determined: according to the positioning parameter K_1_3 (1, 3, 0.429, 5) corresponding to the wolfberry of the A_1_3, it can be seen that the time $\Delta t1\_3$=0.429 s is the shortest time, the earliest signal detected by the line scan positioning camera is the wolfberry of the A_1_3, and its arrangement order is p_3=5. It can be seen that the wolfberry is the 5th wolfberry on the connecting line of the point (0, 800) and the point (1280, 800). After computer processing, it can be seen that a pixel position of a half-peak width of the 5th signal peak of the line scan signal L_1_3 is D_1_3=1230.

Process III: First, a pneumatic nozzle that needs to be started is calibrated, and an effective working range of the selected pneumatic nozzle is E=60 pixels. Then, by a calculation formula mod (H/E)=mod (1280/60)=20≠0, a pneumatic nozzle array is divided into floor (1280/60)+1=22 intervals, that is, R1=22 nozzles are required. A total effective working interval of the first 21 nozzles is [1, 1260], and an effective working interval of the 22nd nozzle is [1261, 1280].

It is known that the pixel position of the half-peak width of the line scan signal L_1_3 of the unqualified wolfberry A_1_3 is D_1_3=1230, q_3=floor [(1230−1)/60]+1=21 can be obtained by a calculation formula q_i=floor [(D_t_i−1)/E]+1. Therefore, the nozzle used to eliminate the unqualified wolfberry A_1_3 is the 21st nozzle.

Then, the time $\Delta t2\_3$ required for movement from a position of the wolfberry of the A_1_3 to an action site of the pneumatic nozzle at the moment of t+$\Delta t1\_3$=1.429 s is calculated. A center line 12 of an effective working range of the pneumatic nozzle array is set to be parallel to the line scan area 11, and a height difference between the center line and the line scan area is h2=0.05 m. By a formula $$\Delta t2\_3 = \frac{\sqrt{2(h1+h2)} - \sqrt{2h1}}{\sqrt{g}} = \frac{\sqrt{2(0.8+0.05)} - \sqrt{2 \times 0.8}}{\sqrt{9.8}},$$

the time required for the wolfberry of the A_1_3 to move to the action site of the pneumatic nozzle after the moment of t+$\Delta t1\_3$=1.429 s is obtained as $\Delta t2\_3$=0.012 s.

The h2 is essentially a distance between the two parallel lines. The center line 12 of the effective working range of the pneumatic nozzle array is parallel to the line scan area 11, so the height difference h2 between the two parallel lines is determined.

Finally, the sorting parameter of the unqualified wolfberry corresponding to the A_1_3 is calculated as Q_1_3 (1, 3, 0.429, 0.012, 21). The physical meaning of the parameters in the sorting parameter Q_1_3 is expressed as follows. Since the materials are conveyed, at the moment of t=1 s, the area scan camera 1 is started and acquires the area scan image I_1 in the scan area, and then sends the image to the industrial computer 7 for signal processing, and three unqualified wolfberries are identified in the area scan image I_1. After 0.429 s, the first unqualified wolfberry A_1_3 passes through a line scan positioning module. After the positioning is completed, after 0.012 s, the first unqualified wolfberry A_1_3 enters the effective working site of the 21st pneumatic nozzle of the pneumatic nozzle array 4, so after 1+0.429+0.012=1.441 s, by taking a material conveying direction as a positive direction, the 21st pneumatic nozzle from left to right ejects an airflow under a command issued by the central control module, and the unqualified wolfberry of the A_1_3 is eliminated.

In the same way, the sorting parameters of other unqualified wolfberries can be calculated as: Q_1_1 (1, 1, 0.504, 0.012, 9), and Q_1_2 (1, 2, 0.454, 0.012, 13) respectively.

Step III: The central control module turns on the 9th pneumatic nozzle to eliminate the wolfberry of the A_1_1 at the moment of 1.516 s when the material starts to be conveyed according to the above sorting parameters of different wolfberries, turns on the 13th pneumatic nozzle at the moment of 1.466 s to eliminate the wolfberry of the A_1_2, and turns on the 21st pneumatic nozzle at the moment of 1.441 s to eliminate the wolfberry of the A_1_3. The eliminated unqualified products 9 enter an unqualified product slot 6, and qualified products 10 fall into a qualified product slot 5.

Note: the above embodiments are merely intended to illustrate the present invention, rather than to limit the technical solutions described in the present invention. Therefore, although this specification describes the present invention in detail with reference to the above-mentioned embodiments, those of ordinary skill in the art should understand that the present invention can still be modified or equivalently replaced. All technical solutions and improvements made without deviating from the spirit and scope of the present invention should be covered by the scope of the claims of the present invention.

What is claimed is:

1. A color sorting method for small-grain agricultural products combining an area scanning photoelectric characteristic and a line scanning photoelectric characteristic, characterized by comprising the following steps:

step I, performing area scanning identification on the small-grain agricultural products, comprising the following processes:

process I, erecting an area scan camera above an outlet of a conveyor belt of a material conveying device, setting a width of an area scan area of the area scan camera to be equal to a width W of the conveyor belt, and meanwhile setting a length of the area scan area of the area scan camera as L and setting a conveying speed of the conveyor belt as V0; and starting the area scan camera cyclically to obtain an area scan image I_t of the area scan area containing M×N pixels at each of different moments of t;

process II, analyzing the small-grain agricultural products in the area scan image I_t by using an image processing algorithm, extracting area array features of single-grain agricultural products in the area scan image one by one, identifying unqualified agricultural products in the area scan image I_t according to the area array features, and marking areas A_t_1, A_t_2, . . . , A_t_(n−1), and A_t_n corresponding to the unqualified agricultural products, wherein n is a number of particles of the unqualified agricultural products in the area scan image I_t, and a value of n is a natural number; and process III, establishing a rectangular coordinate system by taking a y-axis of a conveying direction of the conveyor belt as a positive direction, a lower left vertex of the scan area of the area scan camera as a coordinate origin (0, 0), and a pixel point as a minimum unit of a coordinate scale; and locating center pixels P_t_i (x, y) of areas A_t_i corresponding to the unqualified agricultural products one by one, calculating time Δt1_i required for the unqualified agricultural products of the A_t_i to move from a position at a moment of t to a line scan area, and arrangement orders p_i of the unqualified agricultural products of the A_t_i along an x-axis direction in the current area scan image I_t so as to determine positioning parameters K_t_i (t, i, Δt1_i, p_i) corresponding to the unqualified agricultural products of the A_t_i, and feeding back the positioning parameters to a central control module, wherein i∈[1, n];

step II, performing line scanning positioning on the unqualified agricultural products during falling of the agricultural products, comprising the following processes:

process i, starting a line scan positioning camera by the central control module at moments of t+Δt1_i successively in an order of the Δt1_i from small to large according to the positioning parameters K_t_i (t, i, Δt1_i, p_i) corresponding to the area scan image I_t fed back in step I to obtain line scan signals L_t_i corresponding to the unqualified agricultural products of the A_t_i, wherein a number of pixels is H;

process ii, returning a signal value less than or equal to h in the L_t_i to 0 by taking the h as a denoising threshold, then calculating a peak width F_t_i corresponding to a (p_i)-th peak in the L_t_i, and calculating a pixel position D_t_i corresponding to a half-peak width (F_t_i)/2; and process iii, determining a pneumatic sorting nozzle q_i corresponding to the unqualified agricultural products of the A_t_i in combination with the D_t_i according to a calibrated corresponding relationship between a line scan signal pixel and a position of the pneumatic sorting nozzle; and meanwhile, calculating time Δt2_i required for movement from a position of the unqualified agricultural products of the A_t_i to an action site of the pneumatic sorting nozzle at the moment of t+Δt1_i so as to determine sorting parameters Q_t_i (t, i, Δt1_i, Δt2_i, q_i) of the unqualified agricultural products of the A_t_i, and feeding the sorting parameters back to the central control module; and step III, performing pneumatic sorting on the unqualified agricultural products, comprising the following processes:

controlling an airflow ejected from the (q_i)-th pneumatic sorting nozzle by the central control module at the moments of Δt1_i+Δt2_i successively in the order of Δt1_i+Δt2_i from small to large according to the sorting parameters Q_t_i (t, i, Δt1_i, Δt2_i, q_i) corresponding to the area scan image I_t fed back in step II to change a falling trajectory of the unqualified agricultural products of the A_t_i and realize pneumatic sorting on the unqualified agricultural products, wherein in step I, a method for determining the time Δt1_i required for the unqualified agricultural products of the A_t_i to move from the position at the moment of t to the scan area of the line scan positioning camera comprises Δt1_i=Δt1_i_1+Δt1_i_2, wherein Δt1_i_1 is time required for uniform linear motion of the unqualified agricultural products of the A_t_i from the moment of t to an end of the conveyor belt, and Δt1_i_2 is time for horizontal projectile motion of the unqualified agricultural products of the A_t_i from the end of the conveyor belt to the line scan area, wherein a method for determining the Δt1_i_2 is $$\Delta t1\_i\_2 = \left| \sqrt{\frac{2h1}{g}} \right|,$$

h1 is a height difference between a horizontal end of the conveyor belt and the line scan area, and a boundary line at the end of the conveyor belt is parallel to the line scan area; and g is a gravity acceleration of a located area of color sorting equipment.

2. The color sorting method for the small-grain agricultural products combining the area scanning photoelectric characteristic and the line scanning photoelectric characteristic according to claim 1, wherein in step I, a method for calculating the arrangement orders p_i of the unqualified agricultural products of the A_t_i along the x-axis direction in the area scan image I_t comprises: first, according to the established rectangular coordinate system, determining the center pixel coordinates P_t_i (x, y) of the unqualified agricultural products A_t_i; then, binarizing the area scan image I_t to obtain m line segments on a connecting line of a pixel point (0, P_t_i (y)) and a pixel point (M, P_t_i (y)), and extracting coordinates (Z_k', P_t_i (y)) and (Z_k", P_t_i (y)) of two end points of the m line segments respectively; and finally, determining a relationship between the center pixel coordinates P_t_i (x, y) of the unqualified agricultural products A_t_i and the coordinates (Z_k', P_t_i (y)) and (Z_k", P_t_i (y)) of the end points, wherein when Z_k'<P_t_i (x)<Z_k", it is determined that the arrangement orders of the unqualified agricultural products of the A_t_i along the x-axis in the area scan image I_t are as follows: p_i=k, and m is an integer greater than 0, and k∈[1, m].

3. The color sorting method for the small-grain agricultural products combining the area scanning photoelectric characteristic and the line scanning photoelectric characteristic according to claim 1, wherein a method for determining the Δt1_i_1 comprises: Δt1_i_1=ΔL_i/V0, wherein V0 is a constant movement speed of the conveyor belt; ΔL_i is a horizontal distance between the center pixels P_t_i (x, y) of the areas A_t_i of the unqualified agricultural products and an end of the conveyor belt; and a calculation method for ΔL_i is ΔL_i=L*[N-P_t_i (y)]/N.

4. The color sorting method for the small-grain agricultural products combining the area scanning photoelectric characteristic and the line scanning photoelectric characteristic according to claim 1, wherein in step II, a method for calibrating the corresponding relationship between the line scan signal pixel and the position of the pneumatic sorting nozzle is as follows, wherein the line scan area of the line scan positioning camera has a width of W equal to a horizontal scan area of the area scan camera, and a single line scanning comprises H pixels; a length of a total effective range of a pneumatic nozzle array is equal to that of the line scan area, a center line of an effective area of the pneumatic nozzle array is parallel to the line scan area, and a height difference between the center line and the line scan area is h2; and it is assumed that an effective pneumatic interval length of each pneumatic sorting nozzle q_j is E pixels, a number of nozzles R1 required for the pneumatic nozzle array to effectively act on the line scan area with a number of pixels of H is as follows:

first, when a remainder of H divided by E mod (H/E)=0, the number of required pneumatic sorting nozzles R1= (H/E), an effective working interval of the j-th pneumatic sorting nozzle is [(j−1)*E+1, j*E], and j∈[1, R1]; and second, when the remainder of H divided by E mod (H/E)≠0, the number of required pneumatic sorting nozzles R1=floor (H/E)+1; when j<R1, the effective working interval of the j-th pneumatic sorting nozzle is [(j−1)*E+1, j*E]; and when j=R1, the effective working interval is [floor (H/E)*E+1, H], floor (H/E) represents an integer part of H divided by E, and j∈[1, R1].

5. The color sorting method for the small-grain agricultural products combining the area scanning photoelectric characteristic and the line scanning photoelectric characteristic according to claim 1, wherein in process iii of step II, a method for determining the pneumatic sorting nozzle q_i corresponding to the unqualified agricultural products of the A_t_i is q_i=floor [(D_t_i−1/E]+1, and floor [(D_t_i−1)/E] represents an integer part of (D_t_i−1) divided by E.

6. The color sorting method for the small-grain agricultural products combining the area scanning photoelectric characteristic and the line scanning photoelectric characteristic according to claim 1, wherein in process iii of step II, a method for calculating the time Δt2_i required for the unqualified agricultural products A_t_i to move from a current position to the action site of the pneumatic sorting nozzle at the moment of t+Δt1_i is $$\Delta t2\_i \frac{\sqrt{2(h1+h2)} - \sqrt{2h1}}{\sqrt{g}},$$

h2 is a height difference between the line scan area and a center line of an effective area of the pneumatic sorting nozzle, and an end of the conveyor belt is parallel to a scan line of the line scan area; g is a gravity acceleration of a located area of color sorting equipment; and since the h2 is the height difference between the line scan area and the center line of the effective area of the pneumatic sorting nozzle, the h2 is a determined value.

7. The color sorting method for the small-grain agricultural products combining the area scanning photoelectric characteristic and the line scanning photoelectric characteristic according to claim 1, wherein the central control module comprises an industrial computer, a timer, and a programmable logic controller (PLC), and the area scan camera, the line scan positioning camera and a line array pneumatic nozzle are all electrically connected to the central control module.

* * * * *